United States Patent
Ries et al.

(10) Patent No.: US 7,361,140 B2
(45) Date of Patent: Apr. 22, 2008

(54) CONNECTOR FOR A COMBINATION CABLE, COMBINATION CABLE CONNECTED THERETO, SOCKET THEREFOR, DEVICE FOR FEEDING LIGHT, PLUG CONNECTION SYSTEM AND ENDOSCOPY SYSTEM

(75) Inventors: Wolfgang Ries, Leopoldshafen (DE); Reinhold Blazejewski, Sexau (DE)

(73) Assignees: Joimax GmbH, Stutensee (DE); Blazejewski Medi-Tech GmbH, Sexau (DE)

( * ) Notice: Subject to any disclaimer, the term of this patent is extended or adjusted under 35 U.S.C. 154(b) by 446 days.

(21) Appl. No.: 10/488,525

(22) PCT Filed: Aug. 28, 2002

(86) PCT No.: PCT/EP02/09574

§ 371 (c)(1),
(2), (4) Date: Aug. 18, 2004

(87) PCT Pub. No.: WO03/021308

PCT Pub. Date: Mar. 13, 2003

(65) Prior Publication Data

US 2004/0266257 A1 Dec. 30, 2004

(30) Foreign Application Priority Data

Sep. 3, 2001 (DE) .................. 101 43 058

(51) Int. Cl.
*A61B 1/00* (2006.01)
*A61B 1/04* (2006.01)

(52) U.S. Cl. ..................................... 600/132
(58) Field of Classification Search ............... 600/112, 600/117, 132
See application file for complete search history.

(56) References Cited

U.S. PATENT DOCUMENTS

| 4,140,367 A | | 2/1979 | Makuch |
| 4,755,873 A | * | 7/1988 | Kobayashi .................. 348/74 |
| 4,901,142 A | * | 2/1990 | Ikuno et al. ................. 348/69 |
| 5,239,983 A | | 8/1993 | Katsurada |
| 5,349,137 A | | 9/1994 | Cedrone |
| 5,817,015 A | * | 10/1998 | Adair .......................... 600/121 |
| 5,847,759 A | * | 12/1998 | Williams et al. ............ 348/363 |
| 6,348,035 B1 | * | 2/2002 | Takami ....................... 600/132 |
| 6,443,888 B1 | * | 9/2002 | Ogura et al. ................ 600/132 |
| 6,520,908 B1 | * | 2/2003 | Ikeda et al. ................. 600/132 |

FOREIGN PATENT DOCUMENTS

| DE | 32 27 770 | 1/1984 |
| DE | 39 14 978 | 11/1990 |
| DE | 693 15 357 T2 | 11/1994 |

(Continued)

*Primary Examiner*—John P. Leubecker
*Assistant Examiner*—Philip R Smith
(74) *Attorney, Agent, or Firm*—Antonelli, Terry, Stout & Kraus, LLP.

(57) ABSTRACT

A connector for a combination cable comprising at least one light guide and several electric lines has body, which can be introduced in the plugging direction into a socket and by means of which the connector can be held in the socket, a light guide holder having a light guide reception channel open at both sides and at least two contact elements in each case connectable to one of the electric lines.

4 Claims, 6 Drawing Sheets

FOREIGN PATENT DOCUMENTS

| | | |
|---|---|---|
| DE | 197 35 151 A1 | 2/1998 |
| EP | 0 216 470 | 4/1987 |
| JP | 60 188912 | 2/1986 |
| JP | 04 077706 | 3/1992 |
| JP | 07 013043 | 1/1995 |
| JP | 08 114719 | 9/1996 |
| JP | 11 014852 | 4/1999 |
| WO | WO 98/14111 | 4/1998 |

* cited by examiner

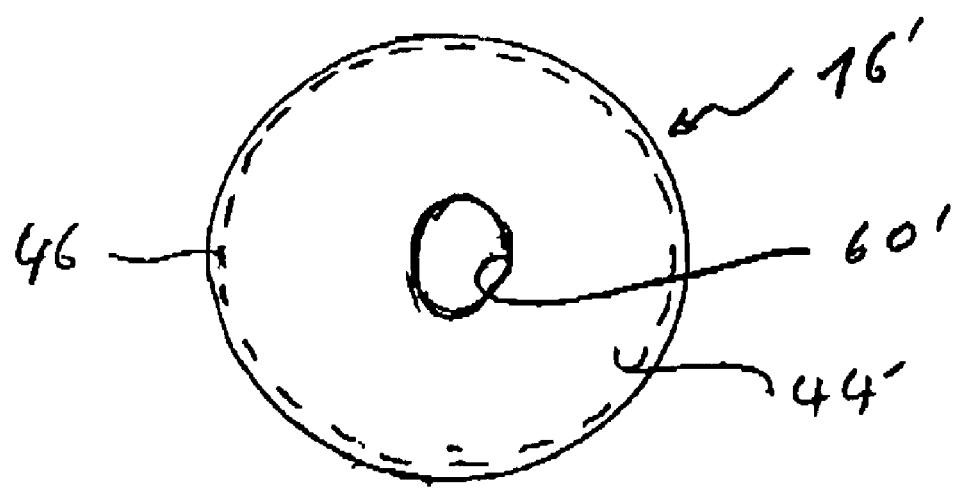

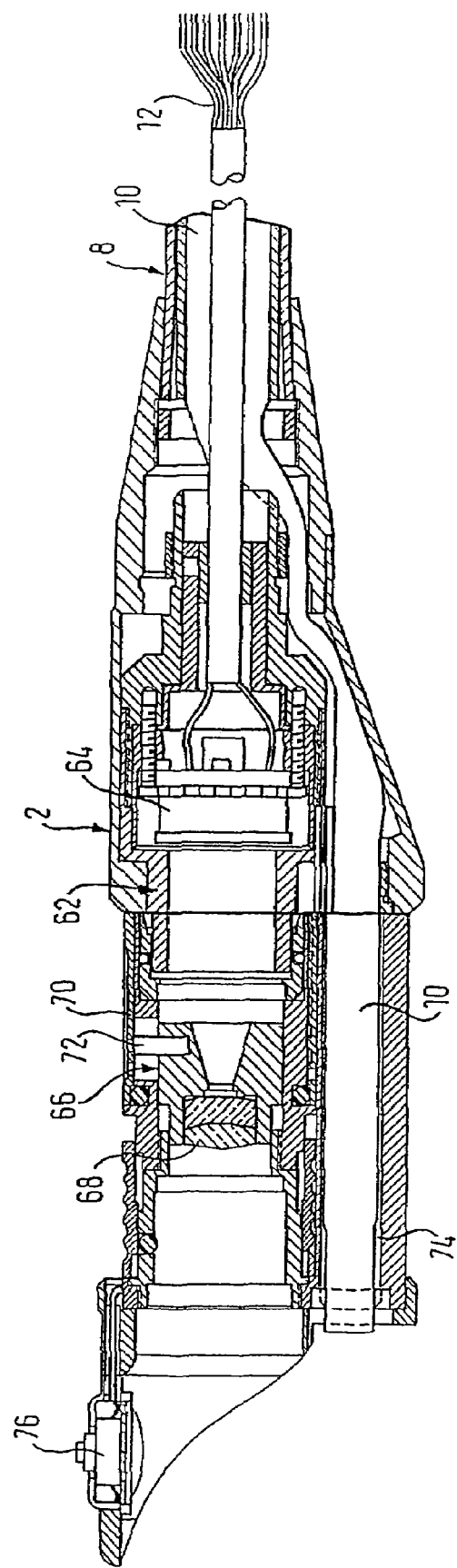

CONNECTOR FOR A COMBINATION CABLE, COMBINATION CABLE CONNECTED THERETO, SOCKET THEREFOR, DEVICE FOR FEEDING LIGHT, PLUG CONNECTION SYSTEM AND ENDOSCOPY SYSTEM

FIELD OF THE INVENTION

The present invention relates to a connector for a combination cable comprising at least one light guide and several electric lines, a combination cable with such a connector, as well as a socket for use with the connector.

BACKGROUND OF THE INVENTION

Combination cables with a light guide and several electric lines are fundamentally known and are e.g. used in endoscopy systems with an optoelectronic camera, e.g. a CCD camera. The electric lines in the combination cable are used for connecting the optoelectronic camera to a supply and evaluating device, in order to on the one hand supply a supply voltage to the optoelectronic camera end on the other to transfer image data or arrays acquired by the camera to the supply and evaluating device, where evaluation thereof takes place. The light guide in the combination cable is used for transmitting light of a light source located in the supply and evaluating device into the area of the optoelectronic camera, so as to illuminate at least part of the visual range of the optoelectronic camera with light from the light source. In the case of endoscopy systems, the light passing out of the light guide does not necessarily have to directly strike the area to be illuminated and can instead be passed to said area by deflection using a further light guide or other optical means.

The light guide can comprise a monofilament or several light-conducting fibres.

In order to ensure a maximum illumination level at the reception location accompanied by a low power consumption of the light source, the combination cable is normally fixed to the supply and evaluating device. The light guide extends into the vicinity of the light source, so that light from the latter is efficiently fed into the same. This avoids connections between light guides, which either lead to high losses or which can only be produced with considerable effort and expenditure.

However, certain disadvantages result from the fixed connection between combination cable and supply and evaluating device.

Thus, it is only possible to a certain extent to clean and/or sterilize the combination cable, which must generally pass into the vicinity of the patient to be treated, because generally the supply and evaluating device is not sterilizable due to the electronics contained therein.

Moreover, in the case of damage to the combination cable, simple replacement thereof is impossible. Changing between cables of different lengths is also impossible, although such a possibility of change would be desirable particularly when using the endoscopy system for different treatment types.

SUMMARY OF THE INVENTION

The problem of the invention is to provide devices to detachably connect a combination cable comprising at least one light guide and several electric lines to other devices, whilst creating a combination cable suitable for detachable connections.

A connector according to the invention for a combination cable of the aforementioned type has a body, which can be inserted in a socket in a plugging direction and by means of which the connector can be held in the socket, a light guide holder having a channel open at both sides for receiving the light guide and at least two contact elements in each case connectable to one of the electric lines.

As a result of the construction of the connector according to the invention, it is simultaneously possible to provide a connection for the light guide and the electric lines.

The combination cable according to the invention has at least one light guide and at least two electric lines. One end of the combination cable is connected to the connector according to the invention and electric lines of the combination cable are conductively connected to contact elements of the connector. The light guide is so positioned in the channel of the light guide holder, that it projects from the body in the plugging direction. This is made possible by the inventive channel in the light guide holder of the connector.

The light guide can comprise a single monofilament or also a group of light-conducting fibres.

A socket according to the invention has a socket body for receiving the connector according to the invention and a socket channel passing through the socket, for receiving a portion of a light guide to be inserted in the inventive connector when the latter is plugged into the socket and contact elements connectable to electric lines for contacting the contact elements of the inventive connector.

Through the combination of the inventive connector on an inventive combination cable with the inventive socket it is possible to easily provide a detachable connection both for the light guide and for the electric lines. In particular, light from a light source can be fed directly into the light guide of the combination cable, if the connector with said combination cable is plugged into the inventive socket, the light guide extending through the inventive light guide holder channel end the light guide portion projecting from the body in the plugging direction can be guided by the inventive socket channel directly into the area of the light source, so that the feeding in of light requires no further connection between two light guides and the intensity losses resulting from such a connection can be avoided.

Further developments and preferred embodiments of the invention are described in the description, claims and drawings.

Preferably the contact elements for the connector according to the invention are positioned on at least one circle running coaxially to the light guide holder. The contact elements in the socket according to the invention are also located on at least one circle passing coaxially to the light guide holder. This symmetrical arrangement makes it possible to press the connector into the socket without significant tilting. Thus, a light guide projecting from the connector body on insertion into the socket channel can be less easily deformed and possibly damaged through tilting.

In particularly preferred manner for this purpose, the contact elements are mutually spaced by identical angular distances.

In the case of the contact elements of the connector, they can be constituted by contact pins and then the socket contact elements are preferably constructed as contact springs. However, the contact pins can also be located in the socket, so that the contact elements of the inventive connector are constituted by contact springs.

Preferably a portion of the inventive connector body open in the plugging direction has a sleeve-like construction, the contact elements being located within the sleeve portion of the body. Thus, particularly when the contact elements are constituted by contact pins, the contact elements are on the one hand protected against mechanical damage and an the other against unintentional contacting with e.g. statically charged objects. In addition, a contacting between the contact elements of the connector and the socket at an appropriate sleeve depth can only take place then the body is guided by the socket body, so that there can be no contact element-damaging tilting of the connector in the socket.

In order to be able to position at a greater distance from the socket a light source whose light is to be fed into the light guide of an inventive combination cable, the portion projecting out of the body is preferably constructed in such a way that the light guide end is positioned outside the socket when the connector is plugged into said socket.

With the combination cable according to the invention, it is preferable for the light guide to project from the body in the plugging direction by at least four times its diameter.

Preferably the light guide of the combination cable according to the invention and independently of its diameter projects in the plugging direction out of the body by at least 10 mm and in particularly preferred manner by 30 mm. Thus, independently of the light guide diameter, it is possible to avoid high heat loading of the socket, of the electrical connections connected to the contact elements of said socket and the housing wall holding the socket by a light source, whose light is fed into the light guide of the combination cable.

The portion of the light guide of the inventive combination cable projecting from the connector body can be deformed or even broken off by the weight of the light guide or by careless or incorrect handling of the connector or a combination cable provided therewith and this can often lead to damage to the light guide. In order to prevent bending of the light guide portion projecting from the body, said portion can be provided in the combination cable according to the invention in preferred manner at least in the portion projecting over the body in the plugging direction with an element stiffening the light guide and preferably a corresponding, bending-resistant jacket.

However, preferably the supporting and guiding of the light guide takes place by means of the light guide holder of the connector according to the invention, which for this purpose projects beyond the body in the plugging direction. Thus, the light guide located in the light guide holder channel can be particularly well protected against deformations, particularly bending. In this case the socket channel is constructed in such a way that the light guide holder can be inserted in said channel.

Preferably the light guide holder portion extending beyond the body in the plugging direction has a length of at least 10 mm and in particularly preferred manner 30 mm, in order to bring about an adequate stiffening and supporting of a light guide introduced into the light guide holder channel. As a result of such a supporting action the light guide portion of an inventive combination cable projecting over the connector body can be particularly long in order to permit an adequately large spacing between a light source and a socket receiving the connector. In particularly preferred manger the light guide holder can receive the light guide at least up to its free end.

Preferably the light guide holder of the inventive connector, at least in the portion extending beyond the body in the plugging direction has a tubular construction, which firstly, as a result of symmetry, can significantly facilitate the first insertion of the light guide holder into the socket channel and secondly permits inexpensive manufacture.

In particularly preferred manner on the connector and the socket body can be provided guide elements, which ensure the centring necessary for the contacting of the contact elements and an azimuthal orientation of the connector with the socket. These can in particular be constituted by a lug on the connector or in the socket and a corresponding recess in the socket or in the connector.

However, preferably, a centring can also be brought about in that the cross-section of the light guide holder of the connector according to the invention in a centring portion which, considered in the plugging direction, is located between the contact elements and the end of the light guide holder is not rotationally symmetrical to an axis extending in the plugging direction. The channel of the socket according to the invention then preferably has a portion with a cross-section, whose shape corresponds to the cross-section of the non-rotationally symmetrical light guide holder portion. The cross-sections are chosen in such a way that it is possible to completely insert the light guide holder portion projecting over the body in the plugging direction into the socket channel. Thus, following the insertion of the light guide holder into the socket channel, there can simultaneously be an azimuthal orientation of the contact elements with respect to one another. Such a cross-section change can also lead to a further mechanical stiffening.

In order to permit a reliable anchoring of the inventive connector in an inventive socket, the connector body is preferably provided on its outer circumference with an element for a latching connection, by means of which the connector can be locked in the inventive socket which has a corresponding element for the latching connection. The latching elements can e.g. be a resilient catch on the connector and a corresponding recess in the socket body. However, in principle, the latch can also be located in the socket, the connector body then having a corresponding recess.

In particularly preferred manner, a sleeve movable parallel to the plugging direction and surrounding the connector body is provided and this makes it possible to release a latching connection with respect to a socket. This makes it possible in simple manner to release the connector from a socket.

Preferably the other end of the combination cable according to the invention is connected to a camera head, which has an optoelectronic camera connected to the electric lines provided with a focussing device adjustable for focussing purposes and a light guide channel open in the camera viewing direction and in which is located the light guide for illuminating at least part of the visual range detectable by the camera. The viewing range is here understood to mean the range which is imaged by the optoelectronic camera and which when using corresponding optical devices need not be located directly in front of said camera. Thus, the statement that the light guide is provided for illuminating at least part of the visual range covered by the camera also does not mean that this range or area must be directly illuminated, but instead that light exiting the light guide can be deflected either by a further light guide or by other optical devices onto the area to be imaged by the optoelectronic camera.

Such a combination cable with camera head can be easily connected in detachable manner to a supply and evaluating unit. Thus, the combination cable with camera head can be separated from the supply and evaluating unit for cleaning and/or sterilization or for interchanging with another combination cable.

For easy focussing purposes, the camera head preferably has a movable focussing ring, which is so connected to the focussing device that by moving the focussing ring the focussing device is adjustable. This makes it possible for the camera head user, particularly when using it in conjunction with an endoscopy system, to simultaneously hold the camera head and focus the optoelectronic camera with a single finger, e.g. the thumb.

In order to permit easy operation of the optoelectronic camera or other electronic devices, a corresponding switching device is provided on the camera head portion located in front of the optoelectronic camera in the viewing direction. In particular, the electric lines leading to said switching device can be the lines of the combination cable. This makes it possible with only one hand to simultaneously guide the optoelectronic camera and at certain times to store and/or print out images acquired by said camera by operating the switching device.

In particular in conjunction with the movable focussing ring, this leads to a camera head which can be very easily operated with one hand, together with an optoelectronic camera, which as such may not have the combination cable and/or connector according to the invention.

A further object of the invention is a device for coupling or feeding light into the light guide of an inventive combination cable, which has an inventive socket and a light source, which is positioned in said device in such a way that the light emitted by the light source can be fed into the light guide located in the inventive connector of the combination cable, when said connector is plugged into the socket. In particular, a corresponding spacing can be provided between the socket and light source and this corresponds to the length of the light guide portion sending beyond the body in the plugging direction.

In particularly preferred manner and for the better feeding in of the light emitted by the light source, there is an optical device for focussing the light emitted by the light source onto the end of the light guide. Preferably the spacing between the socket and the focussing device is made to correspond to the length of the light guide portion extending beyond the body in the plugging direction, which ensures a particularly high light efficiency.

A further object of the invention is a plug connection system with an inventive connector and an inventive socket.

A further object of the invention is an endoscopy system with an optoelectronic camera, a supply and evaluating device with a light source and a combination cable, which comprises a light guide for illuminating at least part of the visual range of the optoelectronic camera with light from the light source and electric lines for the electrical connection of the optoelectronic camera to the supply and evaluating device, in which the combination cable can be connected in detachable manner to the supply and evaluating device. This can in particular be achieved when using an inventive combination cable and a corresponding inventive socket and an inventive device for feeding light into he light guide of the inventive combination cable.

In such an endoscopy system the combination cable can be easily removed for cleaning and/or sterilization or easily replaced in the case of damage. It is also possible to use combination cables of different lengths with a single supply and evaluating device.

BRIEF DESCRIPTION OF THE DRAWINGS

A preferred embodiment of the invention is now described in exemplified manner relative to the attached drawings, wherein show:

FIGS. 2A and 28 Diagrammatic, perspective views of a portion of the combination cable with the connector according to the preferred embodiments of the invention.

FIG. 2C A transverse, cross sectional view of a preferred embodiment of the socket corresponding to the connector of FIG. 2B.

FIG. 4 diagrammatic sectional view through the camera head of FIG. 1.

DETAILED DESCRIPTION OF THE DRAWINGS

Figure 1:
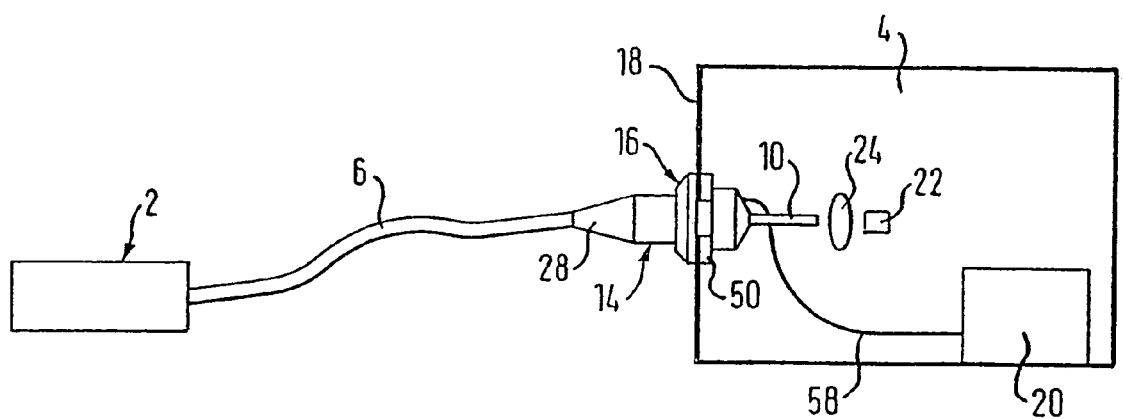
FIG. 1A diagrammatic, partial view of an endoscopy system according to a preferred embodiment of the invention.

In FIG. 1 an endoscopy system according to a preferred embodiment of the invention has a camera head 2 with an illumination system, a supply and evaluating device 4 and a combination cable 6 connecting the camera head 2 to the supply and evaluating device 4 in accordance with an exemplified embodiment of the invention.

The combination cable 6 is used for transmitting a supply voltage and electric signals between the camera head 2 end the supply and evaluating device 4 and for the supply of light to the camera head 2 from the supply and evaluating device 4.

For this purpose the combination cable 6 has in a jacket 8 a light guide 10 and several electric lines 12. As is not shown in the drawings, the light guide 10 comprises a group of light-conducting fibres.

Whilst the camera head 2 is connected in fixed manner to the end of the combination cable 6, by means of a connector 14 located at the other cable end, by means of a socket 16 in a housing wall 18 of the supply and evaluating device 4, the combination cable is connected thereto.

For the supply of the camera head and the evaluation of the images taken, the supply and evaluating device 4 has an electronic unit 20 connected to the socket 16. A light source 22 is also provided and its light can be focussed by means of a lens 24.

Figure 2A:
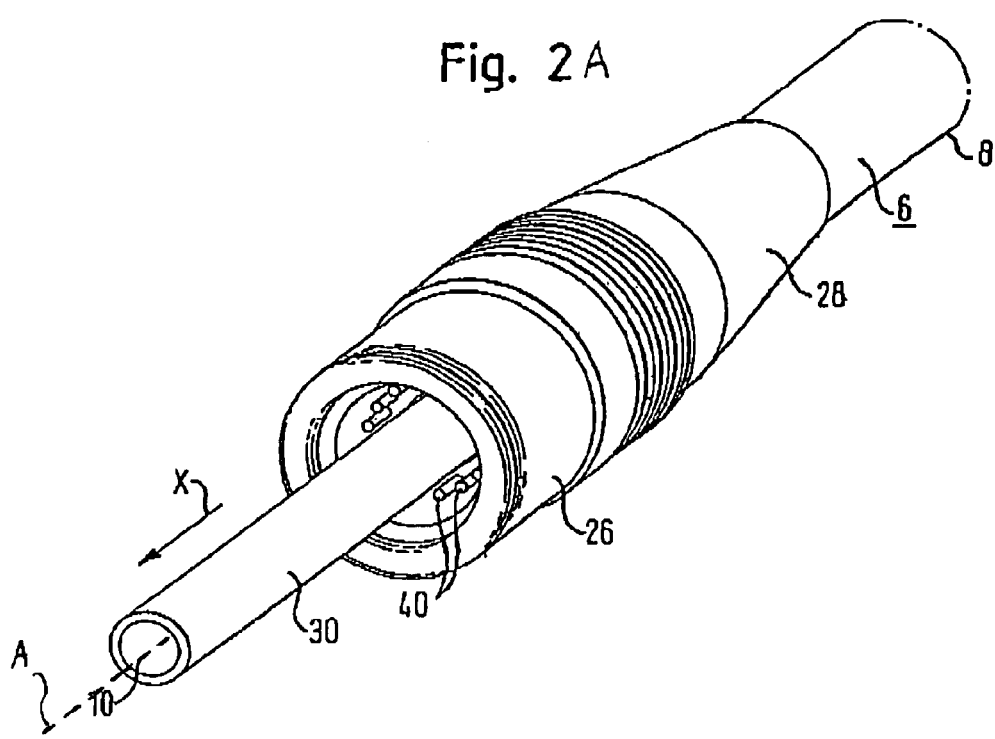

The connector 14 in conjunction with the socket 16 are used for the connection of the combination cable 6 to the supply and evaluating device 4. In FIG. 2A the connector 14 has a sleeve-like body 26 with circular cross-section, which is connected to one end of the combination cable 6, the transition between the body 26 and combination cable 6 being covered by a plastic cuff 28.

A guide holder 30 is positioned to have a longitudinal axis A coaxially to the body 26 and in the plugging direction x extends beyond the body 26 by approximately 65 mm and in a channel 32 contains a light guide 10 of the combination cable 6, which terminates at the end of channel 32 located in plugging direction x.

Figure 3:
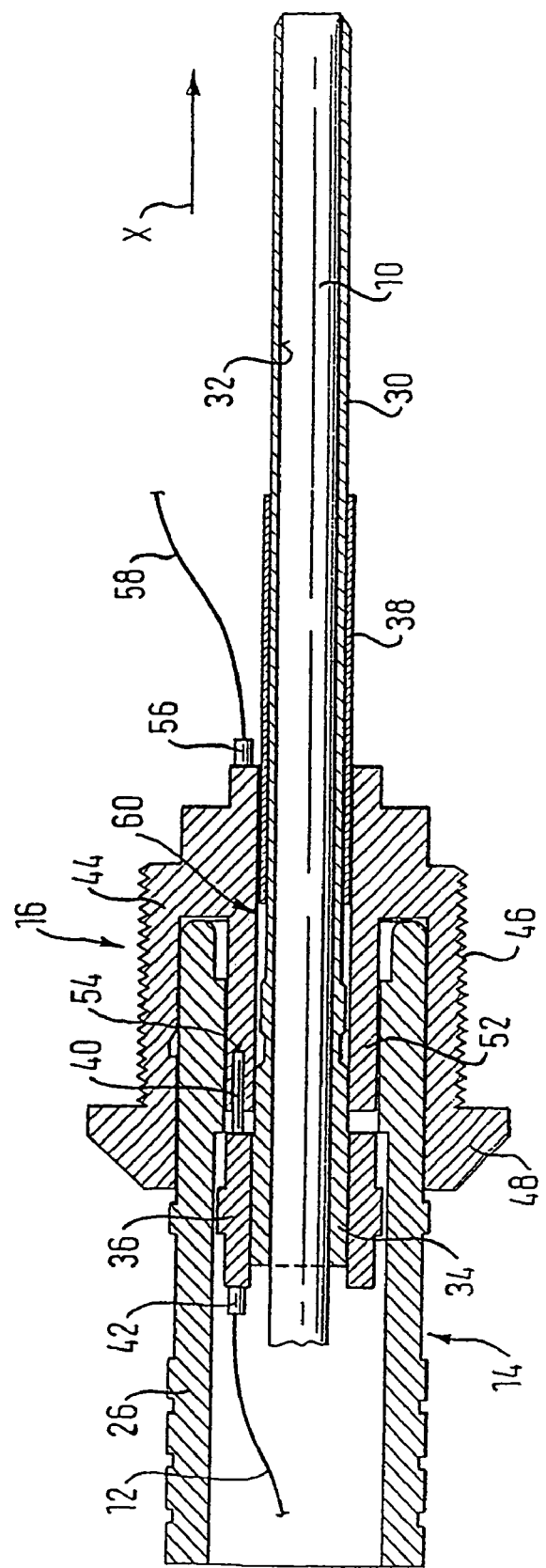
FIG. 3 A part sectional view of the connector of FIG. 2A or 2B in a socket according to the preferred embodiment of the invention.

The light guide holder 30 is shown in greater detail in FIG. 3. It is essentially tubular with a wall thickness of approximately 05 mm and has a fixing portion 34 with a greater wall thickness, to which the light guide holder is fixed in a holding ring 36 secured in body 26. At its end located in the plugging direction X, the light guide holder 30 is bevel ed in order to permit easy insertion of the connector into socket 16.

The light guide holder 30 also has a stiffening tube 38 with a length of approximately 33 mm and a wall thickness or approximately 0.5 mm, which surrounds the tubular portion of the light guide holder 30 receiving the light guide 10 and which extends by roughly a third into the socket 16 and by two thirds beyond the same in the plugging direction X, when the connector 14 is plugged into the socket 16.

In the Interior of the body 26, the holding ring 36 contains sixteen contact pins (of. FIG. 2A) on a circle coaxial to the body 26, the light guide 10 and light guide holder 30 and which by means of connector terminals, whereof only terminal 42 is visible in FIG. 3, are connected to electric lines 12 of combination cable 6. (of FIG. 3).

The socket 16 located in the housing wall 18 of the supply and evaluating device 4 has a socket body 44, which is provided with an external thread 46 and a collar 48, so that it can be slid into an opening in the housing wall 18, as is diagrammatically shown in FIG. 1 and can be fixed by a nut 50 screwed onto the external thread 46.

The socket body 44 is pot-shaped, so that the body 26 of connector 14 can be engaged in the pot opening of the socket body 44.

The socket body 44 also contains a hollow cylindrical portion 52, whose external diameter is selected in such a way that the wall of the body 26 of connector 14 can be slid with only limited tolerance between the inner wall of the socket body 44 and the outer wall of the hollow cylindrical portion.

As is only diagrammatically shown in FIG. 3, the tubular portion also has holes 54 with contact spring elements, which are conductively connected to corresponding socket terminals on the other side of the socket body 44, whereof only socket terminal 56 is shown in FIG. 3. By means of the socket terminals and lines which are e.g. soldered thereto and whereof FIG. 3 only shows line 58, the contact spring elements are connected to the electronic unit 20. The holes 54 are positioned in such a way that on inserting the body, 26 into the socket body 44, the contact pins 40 of the connector can be introduced into the holes 54 with contact spring elements of socket 16.

The hollow cylindrical portion 52, together with a corresponding hole in the socket body 44, forms a socket channel 60, whose internal diameter corresponds to the external diameter of the fixing portion 34. As the external diameter of the light grade holder 30 in the area upstream of the firing portion 34 in the plugging direction is smaller than in the fixing portion 34, this permits an easy introduction of the light guide holder 30 into the socket channel 60. Simultaneously as a result of the press fit between the fixing portion 34 and socket channel 60, there is a precise positioning of the light guide holder 30 and consequently the light guide 10 contained therein.

According to the invention the light guide holder 30 with the light guide 10 projects in the plugging direction beyond the body 26, as shown in FIG. 3 and following the insertion into the socket 16 through socket channel 60 continues well into the interior of the housing of the supply and evaluating unit 4 (cf. FIG. 1). The light source 22 and the focussing lens 24 are positioned directly upstream of the end of light guide 10, so that a precise focussing of the light of light source 22 onto the end of the light grade 10 is ensured by the precise positioning of the light guide holder 30 and consequently a good feeding in of light takes place.

This arrangement ensures a comparatively large spacing between the light source 22 and lens 24 from the portion of socket 16 located within the housing of the supply and evaluating device 4, so that neither the housing wall 18, socket 16 nor socket terminals 56 on socket 16, which in the fitted state normally have soldered connections, are exposed to the heat given off by the light source 22. In the exemplified case, for this purpose the length of the portion of light guide holder 30 extending beyond the body 26. An the plugging direction is approximately 65 mm.

Figure 2B:
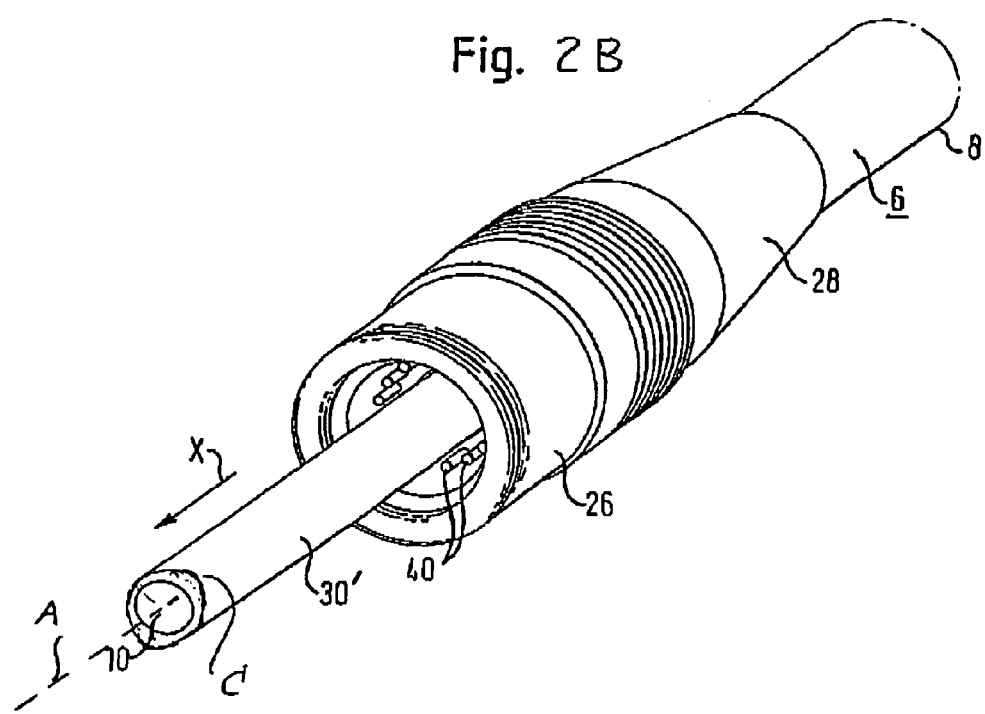

A centring can also be brought about as shown in FIGS. 2B and 2C in that the cross-section of the light guide holder of the connector according to the invention in a centring portion C which, considered in the plugging direction, is located between the contact elements 40 and the end of the light guide holder 30' is not rotationally symmetrical to the axis A extending in the plugging direction, as shown in FIG. 2B. The channel 60' in the socket body 44' of the socket 16' according to the invention then preferably has a portion with a cross-section, whose shape corresponds to the cross-section of the non-rotationally symmetrical light guide holder portion C, as shown in FIG. 2C. The cross-sections are chosen in such a way that it is possible to completely insert the light guide holder portion 30 projecting over the body 26 in the plugging direction Into the socket channel 60'. Thus, following the insertion of the light guide holder 30' into the socket channel 60', there can simultaneously be an azimuthal orientation of the contact elements 40 with respect to one another. Such a cross-section change can also lead to a further mechanical stiffening.

The camera head is shown in greater detail in FIG. 4. It has a CCD camera 62, which is equipped with a CCD sensor 64 connected to the electric lines 12 and an only diagrammatically shown focussing device 66 with a lens system 68 with which light entering the camera head can be focussed onto the CCD sensor 64. Image signals generated by the CCD sensor 64 are transmitted to the supply and evaluating device 4 for evaluation purposes.

On the camera head 2 is provided a focussing ring 70, which can be turned around the optical axis of the CCD camera 62. By means of a pin 72 the movement of the focussing ring 70 can be transferred to the focussing device 66, so that by solely moving the focussing ring 70, an image acquired with the CCD camera can be easily focussed with one finger.

On the camera head is also provided a light guide channel 74 opening in the viewing direction of the CCD camera 62 and into which leads the light guide 10 of combination cable 6. Thus, the light guide channel 74 is positioned in such a way that the light transmitted via the light guide 10 enables the illumination of at least part of the visual range of the CCD camera 62.

On the top of the camera head and connected to two electric lines 12 is provided a push-button stitch 76, which is able to trigger the storage in the electronic unit 20 of an image recorded by the CCD camera 62 and transmitted to the supply and evaluating device 4.

The camera head 6 with CCD camera 62, with illumination by the light guide 10, the focussing rig 70 and the push-button switch 76 allow the camera to be easily handled with one hand.

LIST OF REFERENCE NUMERALS

2 Camera head
4 Supply and evaluating device
6 Combination cable
8 Jacket
10 Light guide
12 Electric lines
14 Connector
16 Sockets
18 Housing wall
20 Electronic unit
22 Light source 24 Lens
26 Body
28 Cuff
20 Light guide holder
32 Channel
34 Fixing portion
36 Holding ring
38 Stiffening tube
40 Contact pins
42 Connector terminal
44 Socket body
46 External thread
48 Collar
50 Nut
52 Hollow cylindrical portion
54 Holes with contact spring elements
56 Socket terminal
58 Line
60 Socket channel
62 CCD camera
64 CCD sensor
66 Focussing device
68 Lens system
70 Focussing ring
72 pin
74 Light guide channel
76 Push-button switch

The invention claimed is:

1. Connector for a combination cable comprising at least one light guide and several electric lines, having a body, which can be inserted in a plugging direction into a socket and by means of which the connector can be held in the socket, a light guide holder and at least two contact elements in each case connectable to one of the electric lines, wherein the light guide holder includes a portion located between the contact elements and the end of the light guide holder in the plugging direction that is not rotationally symmetrical to a longitudinal axis of the connector, and wherein the contact elements are positioned on at least one circle coaxial to the light guide holder.

2. Connector according to claim 1 wherein the light guide holder extends beyond the body in the plugging direction.

3. Connector according to claim 2, wherein the portion of the light guide holder extending beyond the body in the plugging direction has a length of at least 10 mm.

4. Connector according to claim 2, wherein at least in the portion extending beyond the body in the plugging direction, the light guide holder has a tubular construction.

* * * * *